United States Patent [19]

Moran

[11] E Re. 31,305

[45] Reissued Jul. 12, 1983

[54] LIFE PRESERVER OF THE ENCAPSULATED TYPE

[75] Inventor: Harold J. Moran, Trenton, N.J.

[73] Assignee: Switlik Parachute Company, Inc., Trenton, N.J.

[21] Appl. No.: 364,283

[22] Filed: Apr. 1, 1982

Related U.S. Patent Documents

Reissue of:

[64] Patent No.: 4,297,758
Issued: Nov. 3, 1981
Appl. No.: 115,982
Filed: Jan. 28, 1980

[51] Int. Cl.[3] ..... B63C 9/16

[52] U.S. Cl. ..... 441/123; 441/118

[58] Field of Search ..... 441/106–120, 441/122, 123

[56] References Cited

U.S. PATENT DOCUMENTS

| | | | |
|---|---|---|---|
| 1,556,339 | 10/1925 | Marengo et al. | 441/113 |
| 2,621,342 | 12/1952 | Boyle | 441/118 |
| 3,248,746 | 5/1966 | Bernhardt et al. | 441/118 |

FOREIGN PATENT DOCUMENTS 1367341 9/1974 United Kingdom .

*Primary Examiner*—Sherman D. Basinger

*Attorney, Agent, or Firm*—Frederick A. Zoda; John J. Kane; Albert Sperry

[57] ABSTRACT

An inflatable life preserver of the encapsulated type encircling the neck of a wearer includes an inflatable cell or cells confined within a protective cover when in collapsed condition. The cover, formed of a strong fabric or other flexible material, comprises a pair of panels between which the cell is confined. The panels are premanently secured along the edge of a neck-encircling, center opening of the cover. The outer edges of the panels are separably connected, to confine the collapsed cells. Inflation of the cells causes separation of the panels. A protective flap is substantially coextensive in area and configuration with the panels, and lies between the panels so that the cover is in effect composed of three layers. The cells are confined between the flap and one of the panels, the flap being secured along its outer edge to said one panel while having its inner edge left free. In the event of accidental separation of the panels with the cells collapsed, the cells are not exposed, and are protected against damage by reason of being still confined between the flap and the panel to which it is connected. The flap and the panel to which it is connected thus form an auxiliary protective capsule or enclosure for the collapsed cells, which comes into use in the event of accidental opening of the primary enclosure constituted by the main cover panels.

12 Claims, 10 Drawing Figures

LIFE PRESERVER OF THE ENCAPSULATED TYPE

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates generally to inflatable life preservers, and in a more particular sense to those inflatable life preservers in which an inflatable cell or cells extends about the body of a wearer, as for example the wearer's neck, and are normally protectively enclosed in a flexible covering.

2. Description of the Prior Art

Inflatable life preservers having cells protectively encapsulated in flexible coverings are not new, broadly speaking. For example, this broad idea will be found in patents such as U.S. Pat. No. 2,621,342.

Heretofore, however, those working in the art have not dealt, so far as is known, specifically with the problem of protecting the confined, collapsed cells against damage in the event of accidental separation of the protective covering. Such separation should, of course, never occur unless and until the cells means is to be inflated in actual use of the life preserver. Yet, life preservers when stored awaiting use are in some instances treated roughly, as for example they may be distorted while being forced into a relatively small stowage area. In these circumstances, the protective covering may be forced open, exposing the inflatable cells to accidental puncture or other structural damage.

SUMMARY OF THE INVENTION

The invention may be summarized as including, in its most basic aspects, a three layer protective covering for the inflatable cells, comprising a pair of outer panels permanently secured together along their inner edges, while being separably connected along their outer edges so as to open responsive to inflation of the confined cell or cells. The middle layer is composed of a protective flap, which has a free inner edge, and an outer edge that is permanently secured to one of the cover panels. An inflatable cell means, when in collapsed condition, is confined between the flap and the cover panel to which the flap is secured.

Normally, the outer cover panels cooperate to define a primary protective encapsulation for the collapsed cell means, as long as they remain separably connected along their outer edges. Upon accidental separation of the outer edges of the outer panels, however, at a time when the cell means is not being inflated, the primary encapsulation is lost. Under these circumstances a secondary encapsulation comes into play, comprised of the middle layer or protective flap, and one of the outer panels, which cooperate to still completely enclosed the collapsed cell and will lie as a shield between the cell and any adjacent objects that might do structural damage to it.

At such time as the life preserver is to be put into actual use by deliberate inflation of the cells, the inflation will automatically separate the panels comprising the primary encapsulating means, and at the same time will bias the middle layer or flap out of the way to permit full inflation and expansion of the cell means.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DESCRIPTION OF THE PREFERRED EMBODIMENT

Figure 1:
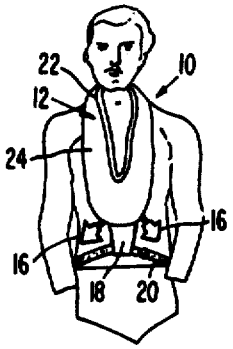
FIG. 1 is a front view of a life preserver formed according to the present invention, as it appears when being worn, prior to inflation.
Figure 2:
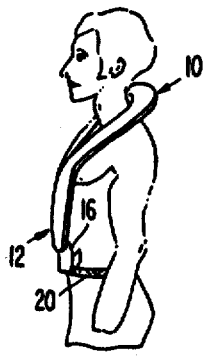
FIG. 2 is a side view of the life preserver when worn, prior to inflation.

The life preserver formed according to the present invention has been generally designated 10. It includes, basically, a protective cover or encapsulation 12, which normally completely encloses an inflatable cell means which in the illustrated example comprises two inflatable cells connected at spaced locations along their inner peripheries by flexible connecting tapes 15. Cells 14 are independently inflated by pull tabs 16, which operate to cause the discharge of an inflating medium from cylinders (not shown) into the respective cells. Each cell extends fully about the neck of the wearer, the cells being disposed in superposed relation. It is conventional to use two cells, so that if one cell fails to inflate, the other cell constitutes a back-up, hence the use of separate cylinders and separate pull tabs 16 for inflating the superposed cells.

The invention can be applied with equal facility to a life preserver of the single cell type, this being considered sufficiently obvious as not to require special illustration herein. Further, the life preserver, whether it be of the single or double cell type, could be of so-called "horse-shoe" or inverted U shape, in which the ends of the protective cover are separably connected below the neck by slide fasteners or the like. Or, the life preserver might be of the belt or waist-encircling type in which a single or double cell inflatable means extends around the waist, rather than the neck of the user.

In the illustrated example, it is conventional to provide a belt strap support member 18 centered upon the waist of the wearer. Carried by the member 18 is a waist-encircling belt 20, which in accordance with normal practice would have suitable take-up means, not shown, for the purpose of permitting it to be secured snugly about the waist of the wearer when the life preserver is put on.

The cell construction and configuration, including a neck-receiving opening 21, the member 18 and the belt 20, are all conventional, and it is also conventional, broadly speaking, to provide a flexible cover or protective encapsulation 12 in life preservers of this type.

It is also known to provide a neck band 22, which would be formed of a soft flexible material designed to minimize chafing of the wearer's neck when the life preserver is in use. In the illustrated example, the neck band 22 extends fully about the neck of the user, thus defining a continuous edge for the neck encircling center opening 21 of the life preserver. As is customary, opening 21 is elongated in a downward direction from the wider upper end thereof, tapering downwardly to a substantially V-necked configuration for maximum comfort.

The primary cover of the device comprises a pair of outer panels 24, 26 of flexible, durable, woven fabric or other material. Panels 24, 26 are substantially identical in area and configuration, that is, the inner edges 24a, 26a thereof are substantially in registration, while the outer edges 24b, 26b are also substantially in registration when the life preserver is awaiting use as in FIG. 6. The inner edges 24a, 26a of the outer panels are stitched as at 28 to the neck band 22, being thus permanently connected through the medium of the neck band. The outer edges 24b, 26b, however, are separably connected so as to completely close the primary protective cover 12 under normal conditions with the cells 14 collapsed, thereby to shield the collapsed cell means against accidental puncture, abrasion, or other structural damage that might result if they were exposed.

Confined between the panels 24, 26 is a protective flap 30. In a preferred embodiment, this is formed of the same material as the panels 24, 26, and is cut to substantially the same pattern as the outer panels, that is, the flap 30 has its inner edge 30a substantially in registration with the inner edges 24a, 26a of the outer covering, when the life preserver is awaiting use as in FIG. 6. The inner edge 30a of the protective flap 30 is left free as clearly shown in FIGS. 6 and 7. The outer edge 30b thereof, however, is permanently secured in a preferred embodiment to one of the panels, in this case the panel 26.

Extending the full length of the outer edges 24b, 26b are "Velcro" pads 32, 34, these being secured to the confronting inner surfaces of the cover panels 24, 26 by stitching 36. The "Velcro" pads mate, one being of the hook variety and the other being of the pile type, so as to normally separably connect the outer edges 24b, 26b over the full periphery of the life preserver. As seen from FIGS. 6 and 7, the outer edge 30b of the protective flap is disposed between the pad 34 and the outer edge 26b of cover panel 26, being secured thereto by the stitching 38. The cell means 14, in these circumstances, is confined between the flap and the panel 26.

It will be understood that instead of using "Velcro" tapes or pads, I may utilize other well known types of separable fasteners that will open to permit the inflation of the cell means, as for example snap or gripper fasteners or indeed any other fasteners that may be caused to separate when the cells are inflated.

Figure 6:
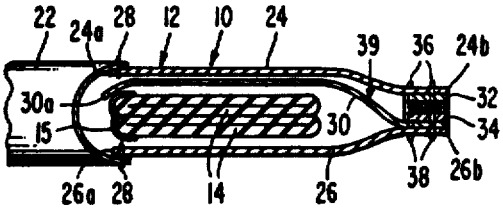
FIG. 6 is a still further enlarged, transverse sectional view substantially on line 6—6 of FIG. 5 with the primary protective enclosure and the auxiliary enclosure both fully closed, the cells being collapsed.
Figure 7:
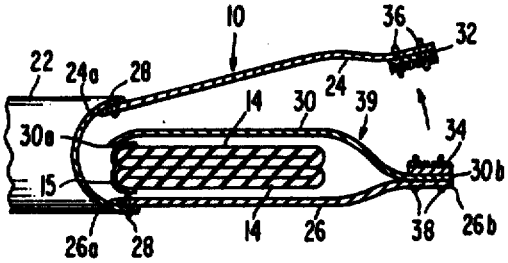
FIG. 7 is a view on the same cutting plane and scale as FIG. 6, in which the primary enclosure has been accidentally opened, with the cells collapsed, the secondary enclosure or encapsulation remaining in position to protect the collapsed cells.

The flap and the panel 26, thus, comprise a secondary or auxiliary protective encapsulation or covering, generally designated 39 in FIGS. 6 and 7. Normally the auxiliary protective covering does not come into play, since the protective outer or main covering 12 provides an enclosure for the collapsed cells, in which the cells are completely confined and are fully protected against damage.

Figure 5:
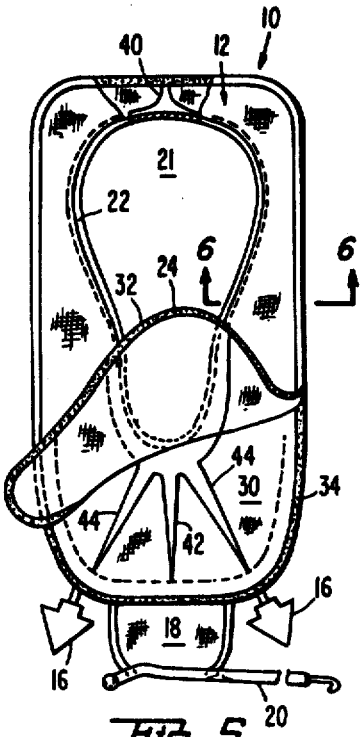
FIG. 5 is an enlarged front elevational view of the life preserver, portions being broken away, and the upper cover panel being illustrated partly opened, to show the protective flap.

*Referring to FIG. 5, above center opening 21 a transverse slit 40 is formed in flap 30. Below said opening, a transverse center slit 42, and a transverse side slit 44 are also formed in the flap 30. The slits extend from the inner to the outer edge of the flap at these selected locations.*

It is common, however, for accidental separation of the cover 12 to occur. Under these circumstances, the cells 14 are normally exposed to possible structural damage. This, of course, is very much to be avoided, since such damage might ultimately result in failure of the life preserver under use conditions, possibly causing the loss of human life.

It is thus seen that in FIG. 7, when and if the primary encapsulation accidentally opens, the cells 14 are still completely shielded against structural damage, by reason of the fact that the auxiliary covering 39 now takes over the protective function, with the cells now being fully protected against damage by reason of being substantially wholly confined between the flap 30 and the panel 26 constituting the auxiliary protection.

Figure 3:
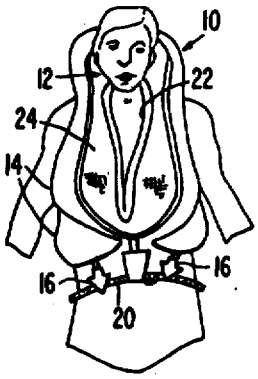
FIG. 3 is a view like FIG. 1 in which the cells have been inflated.
Figure 4:
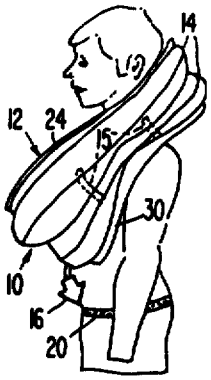
FIG. 4 is a view like FIG. 2 in which the cells have been inflated.
Figure 8:
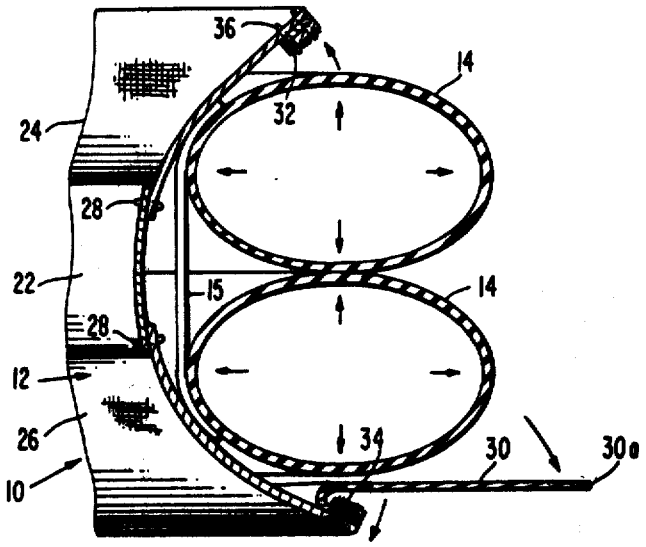
FIG. 8 is a view on the same cutting plane and scale as FIGS. 6 and 7, in which the cells have been inflated, causing separation or opening of both the primary and secondary protective enclosures.

When the life preserver is placed in actual use, that is, when the cells are deliberately inflated, the inflation of the cells (see FIG. 8) causes positive separation of the "Velcro" pads, 32, 34, and also causes the flap 30 to be swung outwardly as shown in FIG. 8, out of the way, so that the cells 14 can fully expand. The life preserver now appears as in FIGS. 3 and 4, fully deployed for use.

The invention thus, at very little increase in cost above that required for manufacture of a conventional life preserver, provides a highly desirable added protection against structural damage to the collapsed cells, in the event of accidental opening of the protective covering during stowage or other handling of the life preserver. Heretofore, this has represented a problem which could even result in the loss of human life in the event there was an accidental puncturing of the cells while accidentally exposed resulting in their failure to inflate when really needed.

Figure 9:
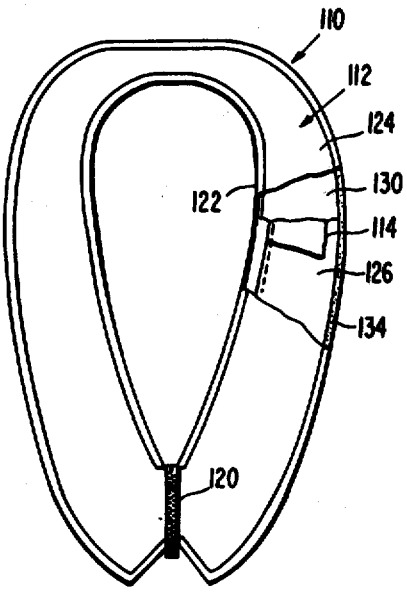
FIG. 9 is a front view of a horse-shoe shaped preserver incorporating the present invention, partly broken away.

In FIG. 9 the invention is incorporated in a life preserver of the horse-shoe shaped type, generally designated 110 and comprising a protective cover 112 including a neckband 122 stitched or otherwise permanently secured to flexible cover panels 124, 126 protectively enclosing an inflatable cell means 114 of the single or double-celled type. Protective flap 130 is secured to panel 126 along their outer edges along with "Velcro" tape 134. In cross-section the numerically designated components are identical in appearance and arrangement with those illustrated in FIG. 6, and correspond thereto in that the FIG. 9 reference numerals designate the same parts as those shown in FIG. 6 except for the addition of the numeral "1", that is, 24 and 124 correspond; 26 and 126 correspond, etc. A slide fastener 120 or other separable connection may be utilized to detachably connect the otherwise free ends of the cover 112.

Figure 10:
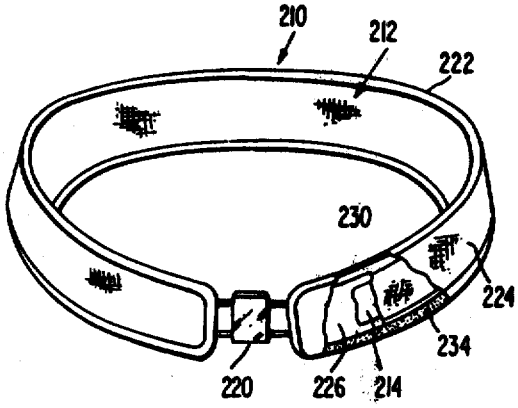
FIG. 10 is a perspective view of a belt-type preserver incorporating the invention, partly broken away.

In FIG. 10 the invention is applied to a belt-type preserver 210 having cover 212 comprised of panels 224, 226. Panel 226 is secured along one edge to flap 230 and disposed therebetween is inflatable cell means 214. A "Velcro" tape 234 is secured to the flap 230 and panel 226. A separable connection 220 secures the ends of the preserver about the user's waist. Again, the parts correspond to similar parts of FIG. 6, that is, 224 and 24 correspond, 226 and 26 correspond, etc. A separable belt buckle 220 is illustrated in this form.

While particular embodiments of this invention have been shown in the drawings and described above, it will be apparent that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. In an inflatable life preserver of the encapsulated type including an inflatable cell means, said life preserver further including a cover adapted to provide a primary protective enclosure for the cell means in [an inflated] *a collapsed* condition of said means, said cover having flexible, normally connected panels in protective embracing relation to the [inflated] *collapsed* cell means and also having separable fastener elements on the panels adapted to disengage for separation of the panels in response to inflation of the cell means, the improvement that comprises a protective flap inside the cover adapted to cooperate with at least one of the panels to provide an auxiliary enclosure for the cell means in the event of accidental separation of the panels with the cell means in [an inflated] *a collapsed* condition, the panels having inner edges connected together [to define said open center] and [have] *having* outer edges along which the [fastened] *fastener* elements are disposed, said flap having an outer edge secured to the outer edge of said one panel, the flap and said one panel being substantially coextensive in width with the flap having a free inner edge overlying and in close proximity to the inner edge of said one panel.

2. In an inflatable life preserver of the encapsulated type, the improvement of claim 1 in which the cell means when uninflated lies wholly between the flap and said one panel.

3. In an inflatable life preserver of the encapsulated type including an inflatable cell means, said life preserver further including a cover adapted to provide a primary protective enclosure for the cell means in [an inflated] *a collapsed* condition of said means, said cover having flexible, normally connected panels in protective embracing relation to the [inflated] *collapsed* cell means and also having separable fastener elements on the panels adapted to disengage for separation of the panels in response to inflation of the cell means, the improvement that comprises a protective flap inside the cover adapted to cooperate with at least one of the panels to provide an auxiliary protective enclosure for the cell means in the event of accidental separation of the panels with the cell means in [an inflated] *a collapsed* condition, the cover including a band, said panels having their inner edges connected to the band, said flap having its outer edge disposed between and secured to the outer edges of said one panel and the fastener elements thereof, the [outer] *inner* edge of the flap being free and the cell means when uninflated being confined [substantailly] *substantially* wholly between the flap and said one panel.

4. In an inflatable life preserver of the encapsulated type that comprises an inflatable cell means and a protective cover therefor that is normally closed but opens in response to inflation of the cell means, the cover including a pair of panels, the improvement comprising a flap lying between the panels, and cooperating therewith to define a three-layer enclosure for the cell means in which the panels constitute the two outer layers and the flap constitutes a middle layer, the flap and the panels having inner and outer edges, the inner edges of the panels being permanently connected and the outer edges thereof being provided with mating fastener elements separably connecting the outer edges of the panels, the inner edge of the flap being free and the outer edge of the flap being connected to the outer edge of one of the panels, the cell means lying between the flap and the panel to which it is connected.

5. In an inflatable life preserver of the encapsulated type, the improvement of claim 4 in which the panels and the flap are substantially similar in configuration and in area with their inner and outer edges respectively extending in closely spaced, substantially parallel relation.

6. In an inflatable life preserver of the encapsulated type, having an open center to encircle the neck of a wearer and including an inflatable cell means extending about said open center, said life preserver further including a cover extending about said open center and adapted to provide a primary protective enclosure for the cell means in [an inflated] *a collapsed* condition of said means, said cover having flexible, normally connected panels in protective embracing relation to the [inflated] *collapsed* cell means and also having separable fastener elements on the panels adapted to disengage for separation of the panels in response to inflation of the cell means, the improvement that comprises a protective flap inside the cover adapted to cooperate with at least one of the panels to provide an auxiliary enclosure for the cell means in the event of accidental separation of the panels with the cell means in [an inflated] *a collapsed* condition, the panels having inner edges connected together to define said open center and having outer edges along which the [fastened] *fastener* elements are disposed, said flap having an outer edge secured to the outer edge of said one panel, the flap and said one panel being substantially coextensive in width with the flap having a free inner edge overlying and in close proximity to the inner edge of said one panel.

7. In an inflatable life preserver of the encapsulated type, the improvement of claim 6 in which the cell means when uninflated lies wholly between the flap and said one panel.

8. In an inflatable life preserver of the encapsulated type having an open center to encircle the neck of a wearer and including an inflatable cell means extending about said open center, said life preserver further including a cover extending about said open center and adapted to provide a primary protective enclosure for the cell means in [an inflated] *a collapsed* condition of said means, said cover having flexible, normally connected panels in protective embracing relation to the [inflated] *collapsed* cell means and also having separable fastener elements on the panels adapted to disengage for separation of the panels in response to inflation of the cell means, the improvement that comprises a protective flap inside the cover adapted to cooperate with at least one of the panels to provide an auxiliary protective enclosure for the cell means in the event of accidental separation of the panels with the cell means in [an inflated] *a collapsed* condition, the cover including a neckband extending about said open center, said panels having their inner edges connected to the neckband, said flap having its outer edge disposed between and secured to the outer [edges] *edge* of said one panel and the fastener elements thereof, the other edge of the flap being free and the cell means when uninflated being confined substantially wholly between the flap and said one panel.

9. In an inflatable life preserver of the encapsulated type having an open center to encircle the neck of a wearer and including an inflatable cell means extending about said open center, said life preserver further including a cover extending about said open center and adapted to provide a primary protective enclosure for the cell means in [an inflated] *a collapsed* condition of said means, said cover having flexible, normally connected panels in protective embracing relation to the [inflated] *collapsed* cell means and also having separable fastener elements on the panels adapted to disengage for separation of the panels in response to inflation of the cell means, the improvement that comprises a protective flap inside the cover adapted to cooperate with at least one of the panels to provide an auxiliary protective enclosure for the cell means in the event of accidental separation of the panels with the cell means in [an inflated] *a collapsed* condition, the flap having transverse slits extending from the inner to the outer edge thereof at selected locations about said open center.

10. In an inflatable life preserver of the encapsulated type, the improvement of claim 9 in which one of said slits is disposed at the back of the user's neck and the remaining slits lie over the user's torso, when the life preserver is being worn.

11. In an inflatable life preserver of the horseshoe shaped encapsulated type that comprises a neck-encircling inflatable cell means and a protective cover therefor that is normally closed but opens in response to inflation of the cell means, the cover including a pair of neck-encircling panels having separably connectable ends, the improvement comprising a flap lying between the panels, and cooperating therewith to define a three-layer enclosure for the cell means in which the panels constitute the two outer layers and the flap constitutes a middle layer, the flap and the panels having inner and outer edges, the inner edges of the panels being permanently connected and the outer edges thereof being provided with mating fastener elements separably connecting the outer edges of the panels, the inner edge of the flap being free and the outer edge of the flap being connected to the outer edge of one of the panels, the cell means lying between the flap and the panel to which it is connected.

12. In an inflatable life preserver of the belt-type that comprises a waist-encircling inflatable cell means and a protective cover therefor that is normally closed but opens in response to inflation of the cell means the cover including a pair of elongated panels shaped to define a belt extendable about the user's waist and having separably connectable ends, the improvement comprising a flap lying between the panels, and cooperating therewith to define a three-layer enclosure for the cell means in which the panels constitute the two outer layers and the flap constitutes a middle layer, the flap and the panels having inner and outer edges, the inner edges of the panels being permanently connected and the outer edges thereof being provided with mating fastener elements separably connecting the outer edges of the panels, the inner edge of the flap being free and the outer edge of the flap being connected to the outer edge of one of the panels, the cell means lying between the flap and the panel to which it is connected.

* * * * *